United States Patent [19]

Glöckner et al.

[11] 4,103,763

[45] Aug. 1, 1978

[54] BRAKING DEVICE FOR DRIVE MOTORS

[75] Inventors: Erhard Glöckner, Eibelstadt; Anton Wittstadt, Sommerach, both of Fed. Rep. of Germany

[73] Assignee: Siemens Aktiengesellschaft, Munich, Fed. Rep. of Germany

[21] Appl. No.: 669,103

[22] Filed: Mar. 22, 1976

[30] Foreign Application Priority Data

Mar. 25, 1975 [DE] Fed. Rep. of Germany ....... 2513219

[51] Int. Cl.² .............................................. F16D 3/14
[52] U.S. Cl. ...................................... 192/2; 188/71.1;
188/73.5; 192/55; 192/70.17; 64/14
[58] Field of Search ................ 188/71.1, 73.5; 192/55,
192/66, 70.17, 70.2, 109 B, DIG. 2, 2

[56] References Cited

U.S. PATENT DOCUMENTS

| 2,116,739 | 5/1938 | Eason | 192/66 |
| 2,120,400 | 6/1938 | Fawick | 192/66 |
| 2,126,760 | 8/1938 | Eason | 192/66 |

FOREIGN PATENT DOCUMENTS 2,335,954   1/1974   Fed. Rep. of Germany .......... 192/2 R Primary Examiner—Benjamin W. Wyche
Attorney, Agent, or Firm—Kenyon & Kenyon, Reilly, Carr & Chapin

[57] ABSTRACT

A braking device for drive motors is disclosed. The braking device includes a brake disk which is adapted to be moved axially by the exertion of a spring force which acts against the rotor of the motor when the motor winding is de-energized. Such axial movement causes the brake disk to engage an oppositely disposed brake lining of the braking device, the latter lining being connected to a stationary part of the device.

In accordance with the invention, the brake lining and the brake disk are configured such that their mutual contact surfaces are arranged in the manner of a cone brake which is at an angle to the rotor displacement and the line of force of the spring. Additionally, the brake lining is resiliently connected, at least in the radial direction, via an elastic intermediary member, with the stationary part of the device. As a result, self-centering of the brake lining occurs when it is engaged by the brake disk.

3 Claims, 4 Drawing Figures

BRAKING DEVICE FOR DRIVE MOTORS

BACKGROUND OF THE INVENTION

1. Field of the Invention

This invention relates to a braking device for drive motors.

2. Description of the Prior Art

In a known type gear breaking device for motors, the device includes a brake disk which is adapted to be moved axially by the exertion of a spring force which acts against the rotor of the motor when the motor winding is de-energized. Such axial movement causes the brake disk to engage an oppositely disposed brake lining of the braking device, the latter lining being connected to a stationary part of the device.

In the aforesaid known braking device, which is described in German Auslegeschrift No. 2,225,004, a brake lining is connected firmly with the brake disk and the oppositely disposed brake lining is connected with the inside of one end bell of the reduction motor. In particular, the contact surfaces of both brake linings are arranged at right angles to the direction in which the brake disk is displaced by the spring force acting on the rotor when the motor is de-energized.

It is an object of the present invention to realize a braking device having substantially increased the braking torque over that realizable by the above described known braking device.

SUMMARY OF THE INVENTION

In accordance with the principles of the present invention, the above and other objectives are accomplished in a braking device of the above type by forming the contact surfaces of the brake disk and the oppositely disposed brake lining so they are arranged in the manner of a cone brake and, thus, at an angle relative to the direction in which the brake disk is to be moved by the spring force acting on the rotor of the motor when the latter is de-energized. Additionally, the brake lining is resiliently connected, at least in the radial direction, via an elastic intermediary member to the stationary part of the device. With the braking device formed in this manner, a substantially higher braking torque is achieved with the same axial displacement force. Moreover, due to the damped suspension of the brake lining, the mutual contact between the brake disk and the brake lining takes place in a self-centering manner. This, in turn, reduces the requirements for accurate machining of the adjoining contact surfaces and the danger of brake squealing.

In the particular embodiment of the invention to be disclosed herein, the brake disk is held in a brake disk ring which is supported in the stationary part of the device which also forms the end bell of the drive motor. More specifically, the brake disk ring is provided with radial, lug-shaped projections which are distributed over its circumference and adapted to be inserted into corresponding recesses of the end bell. The latter recesses, in turn, are formed in axial projections of the end bell. Moreover, they are equipped with axial openings in such a manner that the lug-shaped radial projections of the disk ring can be slid axially into the recesses and the axial openings subsequently closed by a retaining washer which can be connected with the end bell. The inserted brake disk ring is thereby axially secured in the direction of the openings. Also, in this embodiment, the elastic intermediary member comprises shaped parts which are in the form of pockets which fit on the lug-shaped projections of the brake disk ring.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
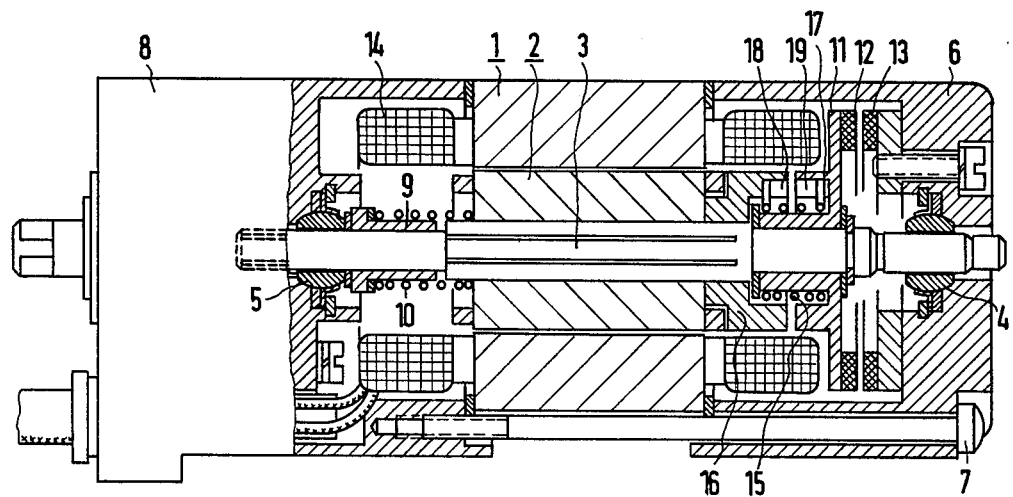
FIG. 1 shows a sectional view of a portion of a motor employing a known braking device.

FIG. 1 shows a drive motor employing a braking device. As shown, the motor comprises a stator 1 and a rotor 2 having a shaft 3 which turns in the bearings 4 and 5 and can be displaced in the axial direction under the action of an electromagnetic force between the energized stator 1 and the rotor 2. The bearing 4 is held in a hood-like end bell 6, which, in turn, is bolted, via bolts 7, to the housing of a reduction gear 8 which is not shown in detail.

Within the empty space formed by the coil heads of the winding 14 of the stator 1, there is fastened, between the bearing 5 and the end face of the rotor 2, on the shaft 3 a bushing 9 with a stop collar on the bearing side. An axial spring 10 is pushed partly over the shaft 3 and partly over the bushing 9 and is braced at its opposite ends against the stop collar of the bushing 9 and the end face of the rotor 2, respectively. If the winding 14 is de-energized, the spring 10 causes an axial displacement of the rotor 2 which is moved by the spring force a short distance to the right out of the stator bore. Such movement continues until the braking device of the drive motor becomes engaged. In particular, the brake lining 12 of the brake disk 11 located at the end face of the rotor is moved into engagement with a counter or oppositely disposed brake lining 13 which is attached to a hood-like end bell 6.

The brake disk 11 is connected with the one end of a second spring 15, which acts as a torsion spring and whose other end is fastened at a driver bushing 16. The bushing 16, in turn, rests against the end face of the rotor 2 facing the bearing 4 and is connected with the shaft 3. The torsion spring 15 is held in place via a cylindrical extension 17 of the brake disk 11 and via axial slots 18 and 19, respectively, which engage suitably bent-off ends of the spring.

Figure 2:
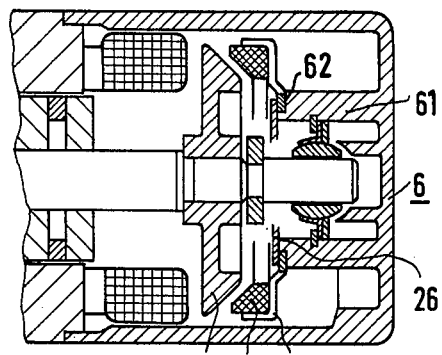
FIG. 2 shows a partial view of FIG. 1 with the braking device modified in accordance with the principles of the present invention.

FIG. 2 shows a braking device in accordance with the principles of present invention which can be employing in the drive motor of FIG. 2. More particularly, the braking device comprises a brake disk 20, which carries no brake lining of its own, and an oppositely disposed brake lining 21 whose contact surfaces are arranged in the manner of a cone brake. Specifically such surfaces are arranged at an angle to the rotor displacement and the line of force of the axial spring 10.

Figure 3:
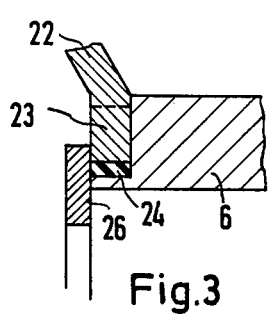
FIG. 3 illustrates an enlarged view of a portion of the braking device of FIG. 2.
Figure 4:
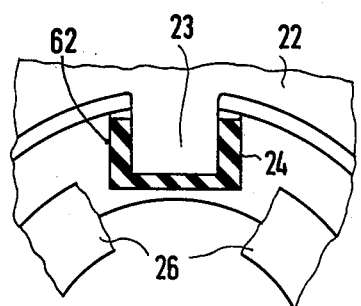
FIG. 4 shows a side view of the enlarged view of FIG. 3.

As indicated, (see FIGS. 3 and 4) the brake lining 21 is held by a brake lining ring 22, which has radial, prong-like projections 23 which are distributed over its circumference and are supported in corresponding recesses of the end bell. To obtain damping and at least radial resiliency, shaped parts in the form of pockets 24 and serving as an elastic intermediary are first pushed over the prong-like projections 23.

Advantageously, the recesses at the end bell 6 for supporting the lining ring 22 are formed as openings 62 in axial projections 61 of the end ball 6. These openings open axially at their end facing away from the end bell in such a manner that the radial prong-like projections 23 of the disk 22 can be readily placed into the openings and the openings on the insertion side of the ring 22 can be subsequently closed by a retaining washer 26. Additionally, the retaining washer 26 can be connected to the axial projections 61 by wedging-over or buttoning-in.

What is claimed is:

1. A braking device for use with a drive motor, said motor being of a type comprising a rotor which is axially displaced by a spring force when the motor winding is de-energized, said braking device comprising:
    a brake lining having a contact surface;
    a brake disk having a contact surface for movement into engagement with said contact surface of said brake lining, said brake disk being adapted to be connected to said rotor for movement therewith when said rotor is axially displaced;
    said contact surfaces being formed at an angle relative to the direction of said movement in the manner of a cone brake;
    a stationary part;
    an elastic intermediary member for resiliently connecting, at least in a radial direction, said stationary part to said brake lining;
    a brake lining ring for supporting said brake lining, said brake lining ring being connected to said intermediary member and including prong-like radial projections distributed over its circumference;
    and said stationary part having recesses for receiving said prong-like projections.

2. A braking device in accordance with claim 1 in which:
    said stationary part comprises axial projections;
    said recesses are in said projections and are equipped with axial openings such that said prong-like projections can be received therein through axial insertion;
    and said braking device further includes a retaining washer connected to said stationary part for closing said openings, thereby securing said brake lining ring to said stationary part.

3. A braking device in accordance with claim 2 in which:
    said intermediate member comprises shaped parts in the form of pockets disposed over said prong-like projections.

* * * * *